United States Patent
Torigoe

[15] 3,675,542
[45] July 11, 1972

[54] METHOD OF MANUFACTURING BAGS

[72] Inventor: Yasuhiro Torigoe, c/o Taiyo Shokai Co. Ltd., No. 16, 15, 4 chome Kitakoiwa Edogawa, Tokyo, Japan

[22] Filed: July 1, 1970

[21] Appl. No.: 51,472

[30] Foreign Application Priority Data

July 5, 1969 Japan..................................44/52813

[52] U.S. Cl..................................93/35 R, 93/8 R, 225/100
[51] Int. Cl........................................................B31b 49/04
[58] Field of Search..........................93/8 R, 35 R; 225/100

[56] References Cited

UNITED STATES PATENTS

| | | | |
|---|---|---|---|
| 3,146,147 | 8/1964 | Naser | 93/8 R UX |
| 3,057,527 | 10/1962 | Hannon | 225/100 |
| 3,447,990 | 6/1969 | Fogg | 225/100 UX |

*Primary Examiner*—Bernard Stickney
*Attorney*—Polachek & Saulsbury

[57] ABSTRACT

The present invention provides a method of manufacturing bags from a strip-like bag material of a thermoplastic synthetic resin and is characterized by having the heat-sealing of the bag material and the severing of the heat-sealed portions performed in two separate steps to thereby secure the smooth transfer of the bag material so that the bag manufacturing efficiency may be enhanced.

1 Claim, 8 Drawing Figures

PATENTED JUL 11 1972

INVENTOR.
YASUHIRO TORIGOE

BY Polachek & Saulsbury
ATTORNEYS

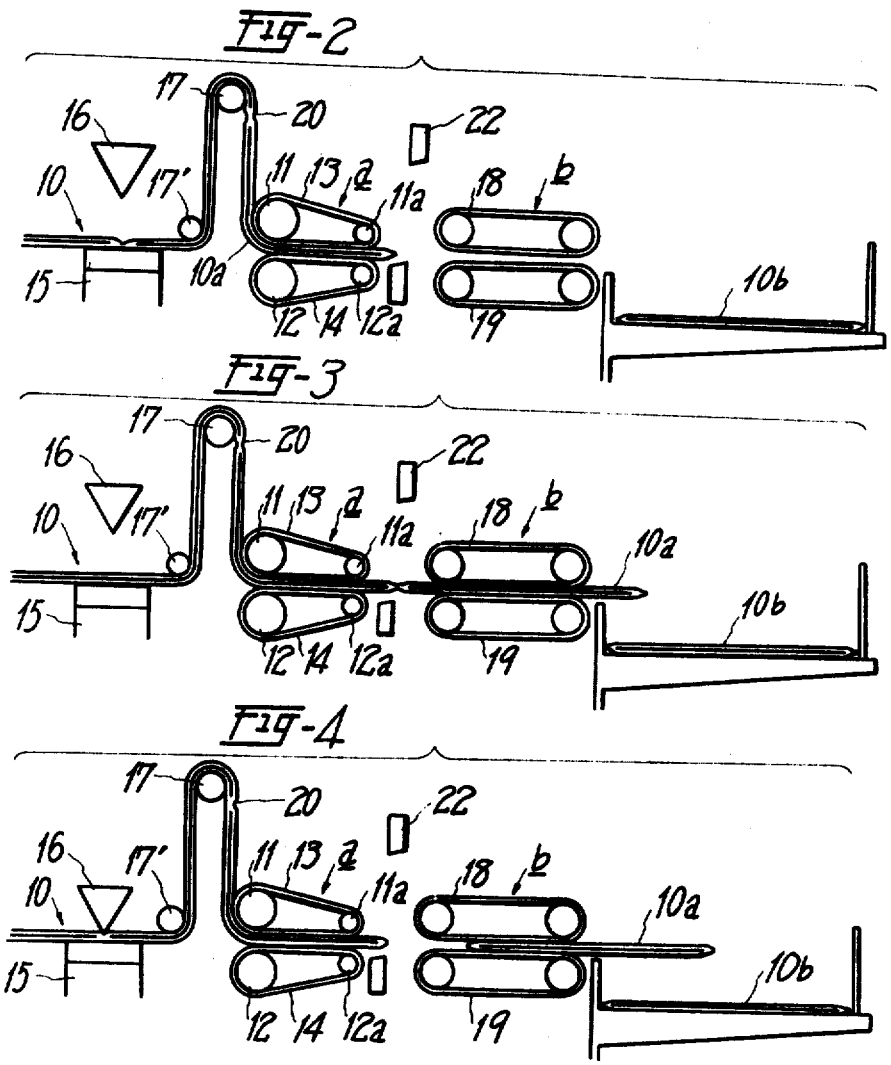

INVENTOR.
YASHIRO TORIGOE

METHOD OF MANUFACTURING BAGS

SUMMARY OF THE INVENTION

The present invention is concerned with a method of and machine for continuously manufacturing bags from a strip-like bag material consisting of a folded film or a tube of a thermoplastic synthetic resin such as vinyl or polyethylene, and more particularly, it relates to a method of and machine for manufacturing side-sealed bags having welded side edges.

In general, in conventional methods and machines in the art, the bags are produced in such a way that the strip-like bag material is placed on a belt conveyor on which the side edges thereof are heat-cut and concurrently heat-sealed by the use of a heat-sealer. With such known methods and machines, however, the divided individual bags are merely resting on the conveyor. Therefore, in case the conveyor is of the type which is operated intermittently, the positions of these individual bags were often displaced owing to their inertia or to air resistance to which the bags are subjected, or the bags tended to adhere to the surface of the conveyor belt at their fused portions. Thus there as required the provision of additional equipment for correcting the irregular positions of the individual bags and for removing the adhered bags off the conveyor means to be transferred thereon continuously. Also, since the heat-cutting and welding were performed at the same time in such known methods and machines, there arose the inconvenience and difficulty in obtaining uniform degree of welding in the heat-sealed portions. Thus, it has been impossible to manufacture bags at high speed.

It is, therefore, an object of the present invention to eliminate the drawbacks and inconveniences of the prior art and to provide a new method of and machine which improve the mechanical strength of the welded portions and which secure the smooth transfer of the bag material to enhance the bag manufacturing efficiency by having the welding and severing of bags performed in two separate steps.

The method of the present invention comprises the following three steps which are performed sequentially. That is to say, it comprises a first step in which a strip-like bag material consisting of a folded film or a collapsed tube of a thermoplastic synthetic resin is heat-sealed transversely across said bag material by a heat-sealer and at the same time an easily severable linear fragile region is formed across the entire breadth of said material along the center line of the heat-sealed portion thereof; a second step in which the heat-sealed bag material is conveyed for a distance corresponding to at least the length of a single bag for cooling the heat-sealed portion; and a third step in which the bag material thus processed is pulled in opposite directions to be separated into individual bags at the linear fragile region thereof.

The machine of the present invention comprises: a first intermittently operated conveyor means having a pair of nipping means and adapted to intermittently convey the strip-like bag material consisting of a folded film or a collapsed tube of a thermoplastic synthetic resin; a heat-sealer provided on the material-feeding side of said first conveyor means and being operable, at each inoperative interval thereof, to press said bag material against the surface of a supporting table to heat-seal the same, said heat-sealer having a welding face having a shape suitable for heat-sealing said bag material transversely in cooperation with the supporting table and also suitable for forming a central fragile linear region in the heat-sealed portion of the bag material; a guide roller provided between said heat-sealer and said first conveyor means and capable of effecting vertical displacement; and a second continuously rotatable conveyor means of nipper type provided on the delivery side of said first conveyor means.

The method and the machine according to the present invention will hereunder be described in further detail with respect to preferred embodiments in conjunction with the accompanying drawings in which:

FIGS. 2 through 4 are diagrammatic representations, showing the process of and machine for manufacturing bags as one embodiment of the present invention;

Figure 6:
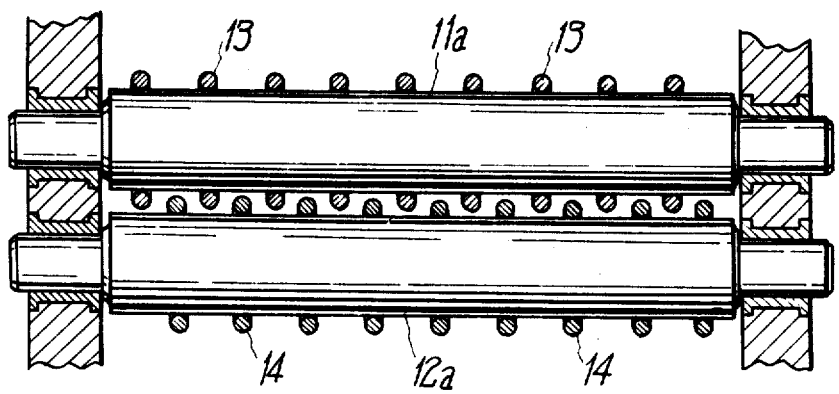
FIG. 6 is a vertical cross-sectional view taken along the line A—A of FIG. 5.

Referring to FIGS. 2 to 4, there is shown a bag-making machine embodying the present invention. The machine is provided with an intermittently operated conveyor means $a$ of a nipper type which comprises a pair of intermittent rollers 11 and 12, a pair of relatively small rollers 11a and 12a provided on the delivery side of the conveyor means and a plurality of endless belts 13 and 14 each having a small circular cross-section. The upper and lower belts 13 and 14 pass over the roller 11 and its mating smaller roller 11a and the roller 12 and its mating smaller roller 12a, respectively in the manner depicted in FIG. 6.

Indicated by reference numeral 15 is a supporting table provided on the feeding side of said intermittently operated conveyor means $a$ and beneath the path of said bag material. Numeral 16 represents a heat-sealer arranged to be brought into contact, at its welding edge, with the upper surface of said supporting table 15 and to be moved away therefrom at each inoperative interval of the conveyor means $a$. This heat-sealer 16 has a welding face in the form of a slightly dull-angled knife edge.

Numeral 17 indicates a guide roller located between the intermittent conveyor means $a$ and the supporting table 15 and arranged to be vertically displaceable relative to the frame of machine, not shown. Indicated by 17' is another guide roller which is fixed below the vertically displaceable guide roller 17.

Indicated by $b$ is another conveyor means of a nipper type having a plurality of endless belts 18 and 19 similar to those of the first conveyor means $a$. As shown, the second conveyor means $b$ is located on the delivery side of said first conveyor means, and is arranged to be continuously rotated. It should be understood that the second conveyor means $b$ may be substituted by a pair of oppositely disposed continuously rotatable rollers.

When it is desired to operate the machine according to the present invention, the bag material 10 consisting of a folded film or a collapsed tube of a thermoplastic synthetic resin such as polyethylene or polypropylene is fed to pass over the supporting table 15 and therefrom to pass around the guide rollers 17' and 17 and then to pass between the pair of intermittent rollers 11 and 12 of the first conveyor means $a$, and therefrom to pass between the upper and the lower endless belts 18 and 19 which are to be rotated continuously.

After the loading of the strip-like bag material on the machine, the intermittently operated conveyor means $a$ is operated to convey the bag material intermittently for a certain distance at a time corresponding to the length of a single bag. During each inoperative interval of the conveyor means $a$, the heat-sealer 16 having a knife-edge is lowered to heat-seal the bag material transversely in cooperation with the upper surface of the supporting table 15 to thereby form a welded portion 20 and also to form a fragile region 21 along the center of said welded portion.

Then, the bag material 10 thus processed is further conveyed intermittently. The position of the guide roller 17 is adjusted so that the feeding of the bag material 10 will be halted in such a way that said welded portion 20 will be positioned midway between the intermittent conveyor means $a$ and the second conveyor means $b$ at the end of one feeding action or at the end of every several feeding actions of said first conveyor means.

When the machine is operated continuously, the bag material 10 which has been heat-sealed by the heat-sealer 16 as depicted in the drawings is transferred by the intermittent conveyor means *a*. While said bag material is conveyed, the welded portion 20 is allowed to cool and solidify. Since the travel of said welded portion 20 stops between the first and second conveyor means *a* and *b*, the forward bag portion 10*a* of the bag material 10 is, at such a time, already nipped between the pair of conveyor belts 18 and 19 of said second conveyor means. Thus, the forward bag portion 10*a* is coercively pulled by these belts and, as a result, the bag portion 10*a* is severed away along said fragile region 21 from the adjacent bag portion and is delivered one after another as the finished bags 10*b* onto the product-receiving table which is provided on the delivery side of said second conveyor means.

Figure 1:
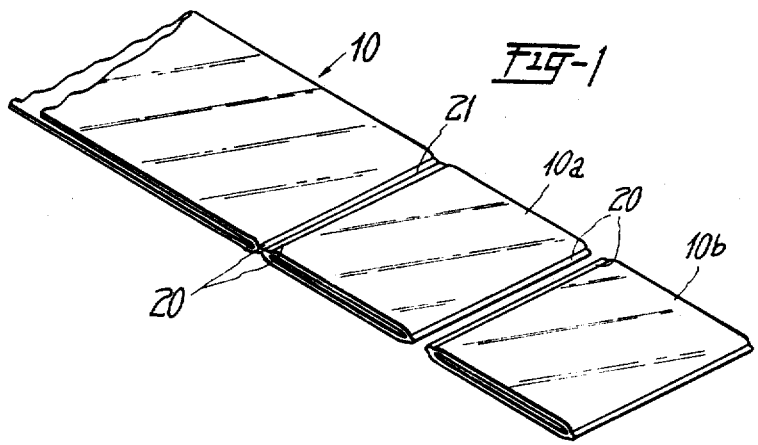
FIG. 1 is a perspective view of a bag material being processed into bags according to the present invention.
Figure 7:
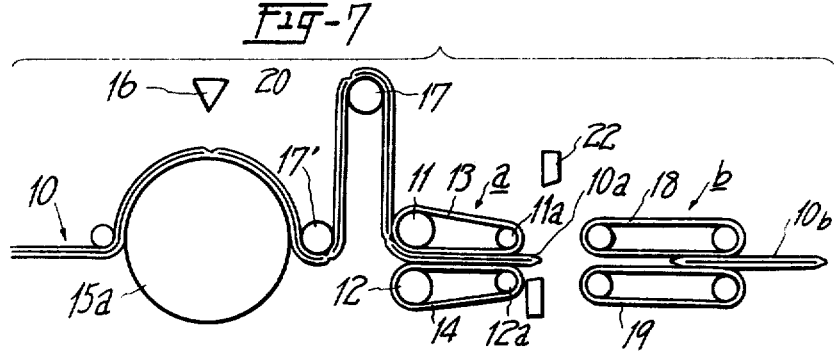
FIGS. 7 and 8 are diagrammatic representations, showing two other embodiments of the machine according to the present invention.

FIG. 7 shows a modified example of the machine of the present invention, in which the supporting table 15 of the preceding example is substituted by a rotatable drum 15a so that this drum rotates while carrying thereon the bag material 10.

Figure 8:
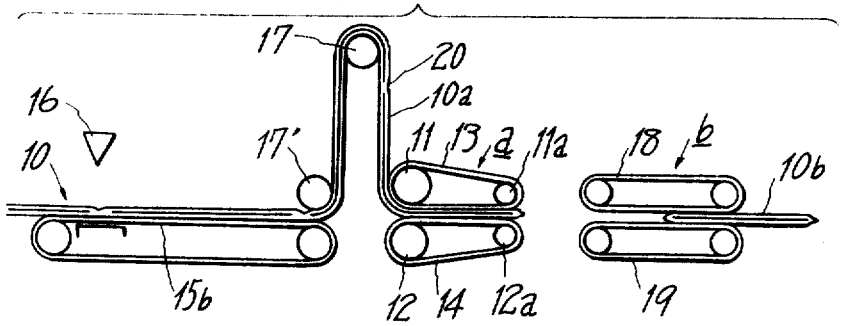
Figure 5:
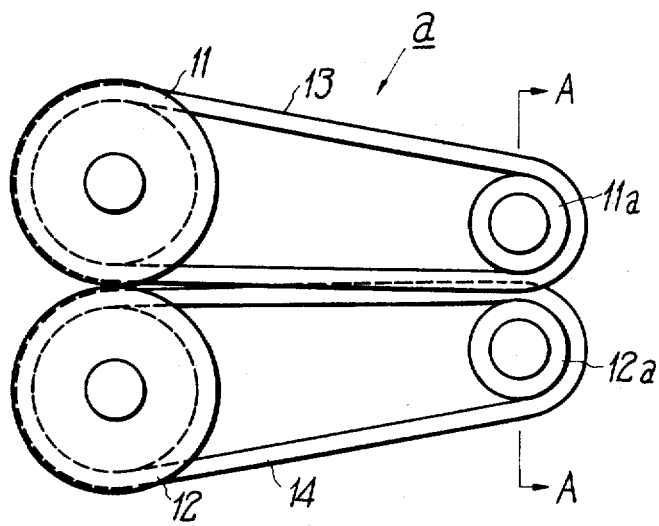
FIG. 5 is an enlarged view of an intermittently operated conveyor means.

FIG. 8 shows still another example of the machine of the present invention, in which said drum 15a of the preceding example is substituted by a belt conveyor 15*b* which also moves together with the bag material 10. These two examples of the machine will provide better cooling effects of the welded portions 20 and will insure no deformations of the welded portions.

As may be seen from the foregoing, according to the method of the present invention, a series of bags that the bag portions can be easily separated from each other at the fragile regions 21, after the portions 20 have been completely heat-sealed, can be obtained. Also, there are obtained individual bags having tightly welded end edges at which the bag portions have been severed from each other and which give a good appearance. In addition to the foregoing advantages, the present invention provides a further merit that, because the bag material 10 is not cut apart at the time of welding, a continuous lengthy bag material with many bag portions can be formed. Furthermore, the bag portions are adapted to be severed from each other along the central fragile regions 21 after the bag material has been transferred for a distance corresponding at least to the length of a single bag. Accordingly, heat-welding may be carried out sequentially even during the period of time until the welded portions become cooled, and thus, the efficiency of bag manufacture is enhanced substantially. What is more, the method of the present invention requires no cutting blades to sever the bag portions.

On the other hand, according to the present invention, even in the case where the welded portions 20 happen to adhere to the supporting table 15, the bag material 10 can be quite easily detached from the surface of the supporting table since the bag portions remain to be continuous until they are separated. Also, because the severing of the bag portions from the continuous bag material 10 into individual bags 10*b* is performed by pulling one bag portion off the adjacent another one, the machine of the present invention does not require the provision of a cutting device comprising a set of blades as have been required by conventional bag-manufacturing machines. This obviates the need for additional operations such as the grinding and the replacement of the blades from time to time, thus markedly reducing the maintenance work and cost.

Furthermore, in the machine of the present invention, means for transferring the bag material 10 and means for transferring the individual bags 10*b* are independent from each other. This permits the selection of optimum conveying speed for each of these two kinds of conveying devices independently of each other.

In the embodiments illustrated, there is shown a guillotine-type cutter 22 which is provided on the delivery side of the intermittent conveyor means *a*. This cutter 22 is arranged to be operated when the continuously operated conveyor means *b* is at rest. It is operatively connected to said intermittent conveyor means so that it can descend to assume its cutting position during the suspension of the operation of the intermittent conveyor means to cut apart the welded portion of the bag material 10 and then to ascend to its normal position.

What I claim is:

1. A method of manufacturing bags comprising the steps of: heat-sealing a strip-like material transversely across the same by a heat-sealer and at the same time forming an easily severable linear fragile region across the breadth of said material substantially along the central line of the heat-sealed portion thereof such that a series of interconnected bags are formed, said strip-like bag material consisting of a folded film of a thermoplastic synthetic resin; conveying the sealed strip-like bag material around the roller guides such that conveying direction is substantially reversed; thereafter conveying the reversed direction material around a roller-pulling means such that a pulling direction is impartable to the material at an angle of at least about 90°; thereafter conveying the heat-sealed bag material for a distance corresponding to at least the length of one of said bags; and pulling the bag material thus processed by means of pinching rollers moving at a greater speed than said roller pulling means such that a terminal bag being passed into the pincher means is separated from subsequent approaching heat-sealed bag material, the separation taking place at the linear fragile region thereof.

* * * * *